No. 690,200. Patented Dec. 31, 1901.
J. G. SMITH, J. POWELL & W. S. TEMPLE.
LEER.
(Application filed Apr. 29, 1899.)
(No Model.) 2 Sheets—Sheet 1.
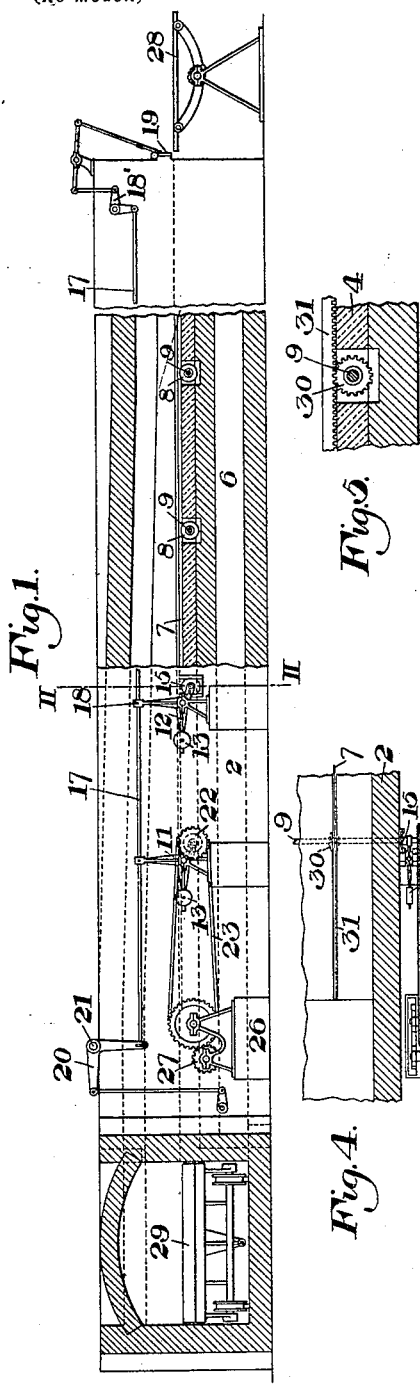
WITNESSES
INVENTORS
John G. Smith, William S. Temple, Joseph Powell
by Bakewell & Bakewell
their Attorneys.

No. 690,200. Patented Dec. 31, 1901.
J. G. SMITH, J. POWELL & W. S. TEMPLE.
LEER.
(Application filed Apr. 29, 1899.)
(No Model.) 2 Sheets—Sheet 2.
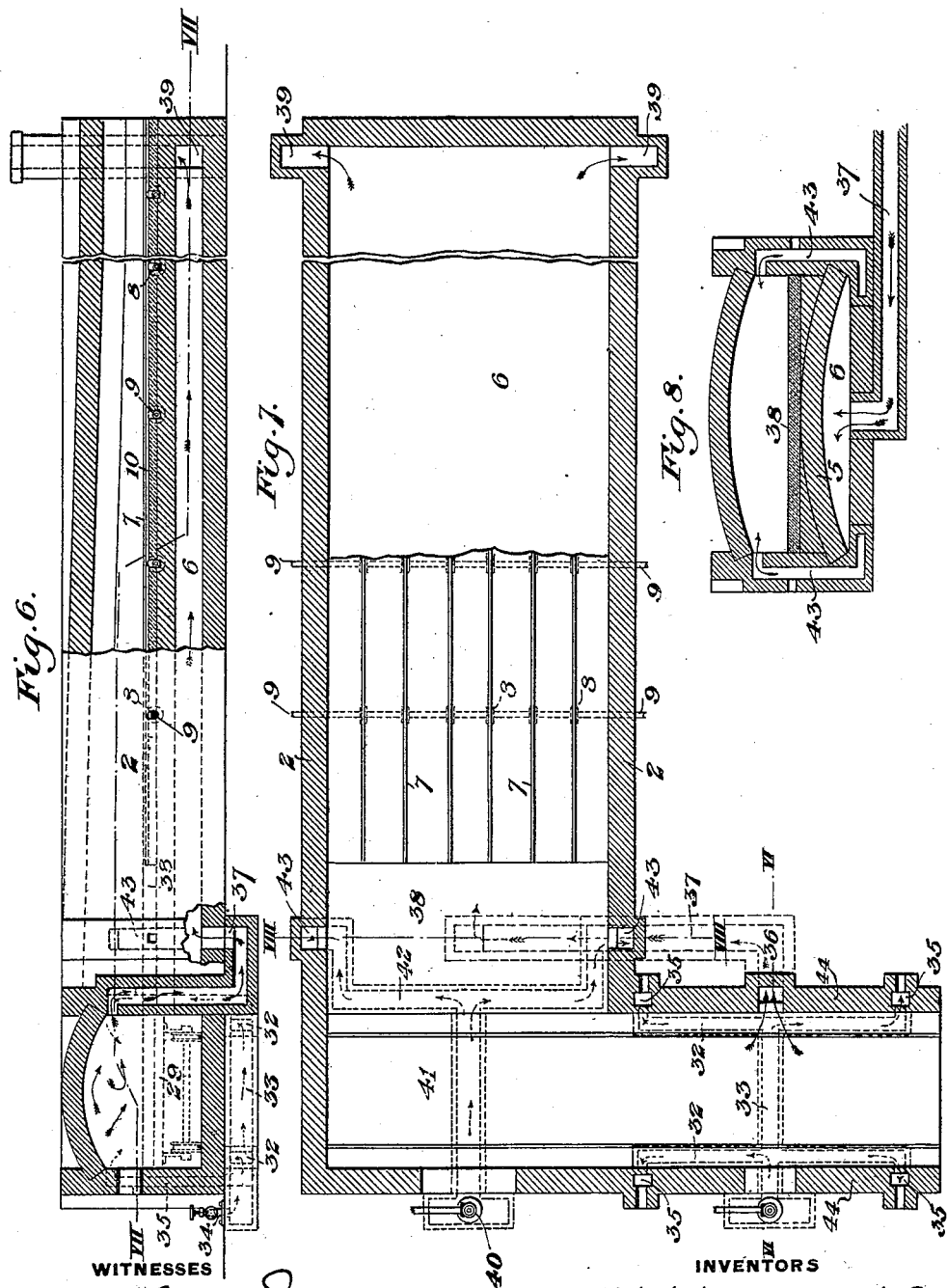
WITNESSES
INVENTORS

UNITED STATES PATENT OFFICE.

JOHN GEORGE SMITH, JOSEPH POWELL, AND WILLIAM S. TEMPLE, OF JEANNETTE, PENNSYLVANIA.

LEER.

SPECIFICATION forming part of Letters Patent No. 690,200, dated December 31, 1901.

Application filed April 29, 1899. Serial No. 714,987. (No model.)

*To all whom it may concern:*

Be it known that we, JOHN GEORGE SMITH, JOSEPH POWELL, and WILLIAM S. TEMPLE, of Jeannette, in the county of Westmoreland and State of Pennsylvania, have invented a new and useful Improvement in Leers, of which the following is a full, clear, and exact description, reference being had to the accompanying drawings, forming part of this specification, in which—

Figure 1 is a side elevation of our improved leer, partially broken away. Fig. 2 is a cross-section on the line II II of Fig. 1. Fig. 3 is an enlarged detail view of part of the bar-raising mechanism. Figs. 4 and 5 are detail views of the driving-gear. Fig. 6 is a side elevation, partly broken away and partly on line VI VI of Fig. 7, showing the leer and the flattening-oven. Fig. 7 is a horizontal section of Fig. 6, and Fig. 8 is a vertical cross-section on the line VIII VIII of Fig. 7.

Our invention relates to the leers used in manufacturing plate or sheet glass, and is designed to provide a leer which will give an even heat throughout and prevent warping of the glass and to improve the construction of the leer and its operating mechanism.

In the drawings, in which like figures of reference indicate like parts, 2 2 are the side walls, having arched roof 3, said roof 3 being for a portion of its length downwardly contracting, as shown in Fig. 1.

4 indicates the bur-bricks resting on arch 5, beneath which is flue or chamber 6, extending the entire length of the leer.

7 indicates leer-bars resting on carrying-pulleys 8 on raising-shafts 9, said bars 7 moving in slots 10 in bur-bricks 4 in the usual manner. The ends of said shafts 9 extend through walls 2 and are engaged by and retained in slotted arm of lever 11, said lever being provided with rearwardly-extending arm 12 and counterbalance-weight 13. To insure closure of the openings in walls 2 necessary for the passage of ends of shafts 9, we provide slotted plates 14, bolted to the exterior of walls 2, and circular plates 15, through which the ends of said shafts pass to engage said slotted arms, said plates 15 working vertically in close contact with plates 14 and retained by strips 16. The upwardly-extending arms of levers 11 are pivoted to shaft 17 by pins 18, said shaft extending the entire length of the leer, terminating in bell-crank lever 18′, having suitable connections, as shown in Fig. 1, for opening and closing flap-door 19 in synchrony with the raising and lowering of bars 7.

20 is a bell-crank lever connecting shaft 17 with suitable mechanism for oscillating the same.

It will be understood that shaft 17 and its bar raising and lowering connections, as hereinbefore described, are duplicated on the other side of the leer, as partially shown in Fig. 2 and represented by primed reference-figures, synchronous movement of both shafts 17 17′ being insured by shaft 21, connecting bell-crank levers 20 20′.

To give the leer-bars the necessary outward and retracting movement, we provide one of the shafts 9, preferably the one nearest the head of the leer, with a sprocket-wheel 22, carrying sprocket-chain 23, meshing with sprocket-wheel 24, which is attached to cog-wheel 25 on standard 26. Meshing with cog-wheel 25 is cog-wheel 27 on suitable power-shaft, (not shown,) which we preferably extend, so as to be under the control of the operator manipulating shaft 17.

28 is a suitable tilting table for the reception of the finished plates.

29 is a delivery-table mounted on a suitable truck.

In Fig. 4 we show in detail our preferred means of imparting the necessary forward and retracting motion to the leer-bars, the same being pinion 30 on shaft carrying sprocket-wheel 22, said pinion meshing with rack 31, which is integral with one of leer-bars 7.

In Figs. 6, 7, and 8 we show the means for heating the leer-chamber and the tunnel beneath it. In these figures 44 is a flattening-chamber, having beneath it longitudinal flues 32, connected by cross-flue 33. A mixer or gas-burner 34 projects into an extension of flue 33 and supplies the heat to the flues 32, from which it rises through the lower vertical flues 35, which open into the flattening-chamber, as shown in Fig. 6. The waste heat passes out through vertical flue 36 into horizontal flue 37, which extends to the center of the rear end portion of flue 6, which is thus heated by the waste products from the flattening-oven. The glass is preferably moved into the flattening-oven by a truck or car 29 (indicated in Fig. 6) and is received upon a set-stone 38, from which it passes into the leer-chamber. The heat after passing through the flue 6 enters the chimney-flues 39. To heat the leer-chamber, we show burner or mixer 40, projecting into horizontal flue 41, which extends beneath the set-stone chamber and opens into horizontal flue 42, from which it branches back with vertical flues 43, which open into the rear chamber at its rear end, as shown in Fig. 8. The heat in the leer-chamber escapes at the front end of this chamber.

The operation of our device is as follows: The leer-chamber and flue 6 being heated by suitable means, plates are successively supplied by delivery-table 29, said plates being successively removed from said delivery-table and placed upon the set-stone (not shown) at the head of leer and successively slid from said set-stone upon the bur-bricks. Previous to the removal of each plate from the set-stone, as described, shaft 17 is caused to move toward the head of leer, thus causing the leer-bars to rise, carrying upon them all the plates upon the bur-buckles and also causing door 19 to open. Power is then applied to cog-wheel 27, causing a rotation of sprocket-wheel 22 and shaft 9 and a consequent outward movement of leer-bars 7. Shaft 17 is thereupon caused to return to its original position, thereby dropping leer-bars beneath the surface of the bur-bricks and permitting the plates to rest on said bur-bricks. Power is then applied to cog-wheel 27 in reverse direction, thus causing the leer-bars to return to their original position, and the operation is continued in like manner.

The advantages of our invention will be appreciated by those skilled in the art to which it relates. It is simple in construction and efficient in operation, and during the passage of the plates through the leer a uniform temperature is maintained on both upper and lower surfaces thereof by reason of the heated gases in flue or chamber 6, thus preventing warping of the plates. Also by the use of flap-door 19 and side closures (shown in Fig. 3) we are enabled to conserve the heated gases and reduce the cost of maintenance.

Changes may be made in the construction of the parts of our improved leer without departing from our invention as defined in the claims, since

What we claim is—

1. A glass-leer having beneath its floor a single transversely-arched flue of substantially the width of the leer, inlet-ports connected to a source of heat for admitting heated gases to said flue and leer, stack-flues leading from the floor-flue and leer, and mechanism for carrying the glass step by step through the leers, substantially as described.

2. A glass-leer having a roof contracting downwardly from the inlet toward the outlet end, and provided with a single transversely-arched flue beneath its floor and of substantially the width of the leer-chamber and sources of heat connected to the leer and flue, said leer and flue being connected to the stack-flue; substantially as described.

3. A leer having a downwardly-contracting roof, a floor having vertically and longitudinally movable bars, and a single transversely-arched flue beneath the floor and of substantially the width of the leer-chamber and sources of heat connected to the leer and flue, said leer and flue being connected to the stack-flue; substantially as described.

In testimony whereof we have hereunto set our hands.

JOHN GEORGE SMITH.
JOSEPH POWELL.
WILLIAM S. TEMPLE.

Witnesses:
S. H. DODD,
ROBT. M. JONES.